3,068,311
FUEL CELLS
Hubert Harold Chambers, New Malden, and Anthony Desmond Shand Tantram, Dorking, England, assignors to National Research Development Corporation, a corporation of Great Britain and Northern Ireland
Filed June 22, 1959, Ser. No. 821,805
Claims priority, application Great Britain Dec. 29, 1955
6 Claims. (Cl. 136—86)

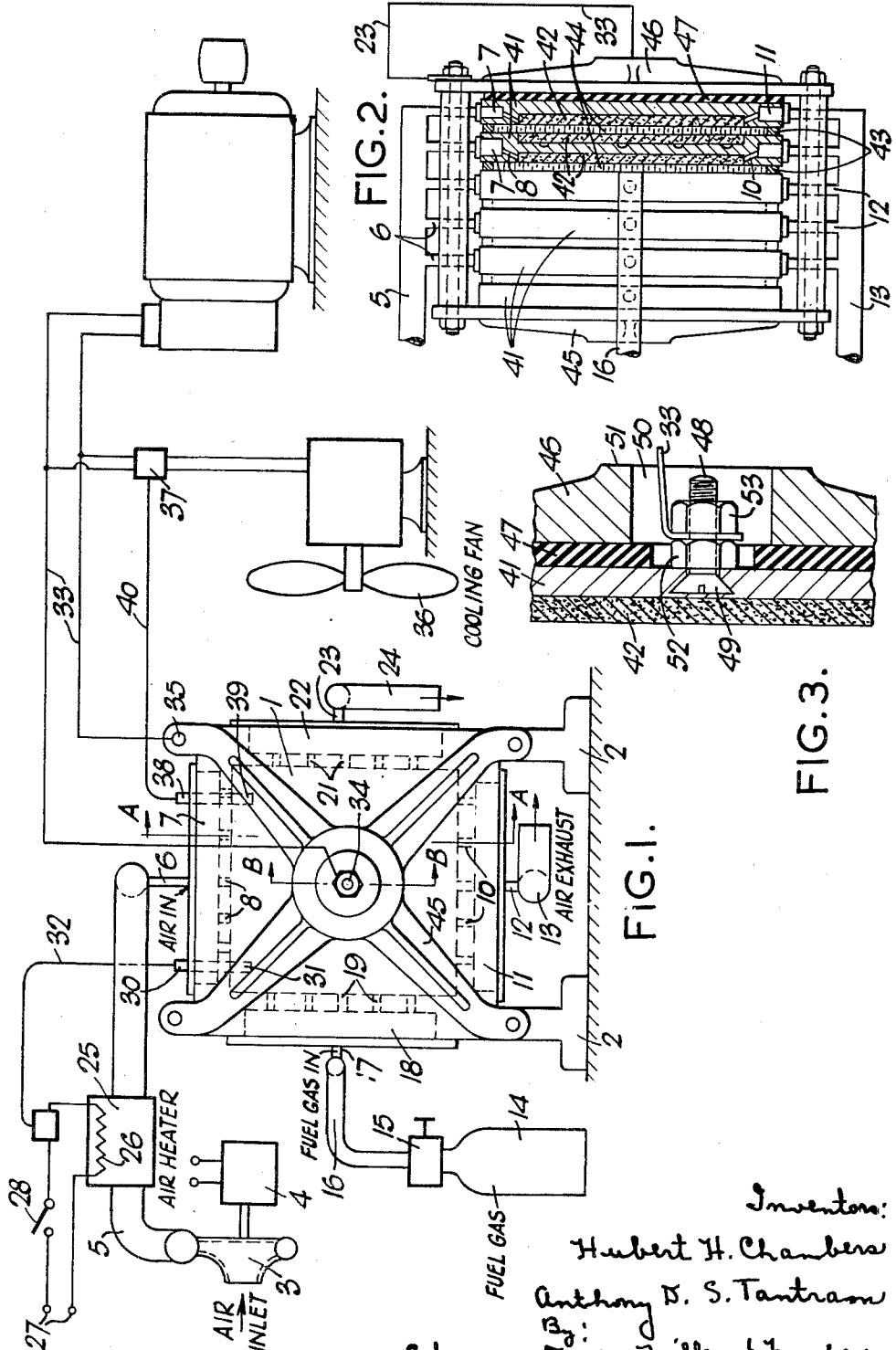

This application is a continuation-in-part of our application Serial No. 629,217, filed December 19, 1956, now abandoned.

The conventional method of generating electricity is to burn fuel and to use the heat of combustion to operate a heat engine (e.g. a steam turbine) driving a generator. It is well known that the best modern power stations have an over-all efficiency of only approximately 30% i.e. only 30% of the chemical energy of the fuel appears as electrical energy, the remaining 70% being degraded to heat.

From well known thermodynamic considerations it is clear that the efficiency of conversion of chemical energy to electrical energy would be increased if the heat engine stage were eliminated. In fact if the oxidation of the fuel could be carried out electrochemically under conditions of thermodynamic reversibility, the whole of the free energy of oxidation would appear as electrical energy.

A fuel cell is a well known device for carrying out this process. In a fuel cell a fuel, generally in the form of a gas, is oxidised producing electricity. A typical cell has two electrodes immersed in and separated by an electrolyte, fuel gas being fed to one electrode and oxygen or air fed to the other electrode.

Some forms of fuel cells operate at elevated temperatures, an example of which is described in "Davtyan, O. K., Direct Conversion of Chemical Energy of Fuel into Electrical Energy, Academy of Sciences, Moscow, 1947." This form of cell operated at 700° C. and at substantially ambient pressure with hydrogen or carbon monoxide as the fuel gas, and a solid electrolyte. The electrodes were of iron and iron oxide. The electrolyte may consist of fused salts, which are liquid at the cell operating temperature, or of mixtures of metal oxides and carbonates, which may be solid at the cell operating temperature, or of mixtures of metal carbonates which are semi-solid at the operating temperature (as described in the co-pending application Serial No. 629,218). A further form of cell is that described by Bacon (in U.K. Pat. No. 667,298) in which two electrodes of porous nickel are immersed in a liquid electrolyte comprising a solution of potassium hydroxide (45%). This form of cell operates at a lower temperature of approx. 200° C. but at a pressure of 600 lb./in.$^2$. Hydrogen is fed to one of the electrodes and oxygen to the other electrode, the hydrogen and electrolyte being circulated, additional hydrogen being fed in to replace that used in the cell.

The present invention is concerned with the type of fuel cell operating at an elevated temperature and ambient pressure with solid, semi-solid or fused electrolytes as described above, hereinafter referred to as "of the type described," and the object of the present invention is to provide novel electrodes for this type of cell.

The main requirements of the electrodes in a fuel cell are (a) That they shall have as high an electronic conductivity as possible;
(b) That they shall not undergo irreversible chemical changes;
(c) That they shall allow the full theoretical E.M.F. of the cell to be developed rapidly.

So far as irreversible chemical changes are concerned, corrosion resistance at the elevated temperature of operation is an important factor which must be considered. It is obvious that the requirement of obtaining full output rapidly is an important commercial factor as it is both uneconomic and in some operating conditions unsatisfactory to have to wait for some time after the connection of the load, before a substantial proportion of the output is available.

Many electrode materials exhibit the undesirable characteristic of polarisation. Materials which have been proposed for electrodes are stainless steel, iron filings, metallic silver, ferrites and mixtures of ferric oxide and magnetite, and it has been found that polarisation was likely to occur and also the deposition of carbon.

We have found that greatly improved results can be obtained by the use of electrodes consisting of a mixture of metallic silver and zinc oxide. The combination of silver and zinc oxide gives an electrode whose catalytic action is quick, enables maximum output to be obtained rapidly and is corrosion resistant. The presence of silver in a finely divided metallic state gives a high electronic conductivity. Polarisation does not occur and the deposition of carbon is avoided.

The present invention provides a fuel cell of the type described in which at least one electrode is composed of a mixture of zinc oxide and metallic silver.

According to a further feature of the invention a fuel cell of the type described may comprise a rigid, self-supporting, porous solid electrode in the form of a porous cermet consisting of zinc oxide powder bonded with metallic silver.

The proportion of silver may vary within wide limits, depending largely upon the particle size of the zinc oxide. All proportions of silver (from 1% upwards) give an improvement in the output of the cell, but generally mixtures containing 20% or more of silver have conductivities which are adequate for economical operation. The upper limit is not critical although for reasons of economy it is seldom desirable to exceed 50% of silver. A practical working range is 20 to 30% of silver.

The electrode material may be in the form of a single layer of substantially uniform porosity, or it may be in the form of a two layer construction, the layer remote from the electrolyte being of larger pore size than the layer adjacent to the electrolyte.

The invention will be more readily understood by the following description of certain embodiments, which are of examples only, in conjunction with the accompanying drawings in which:

FIGURE 1 is a diagrammatic illustration of a complete fuel cell installation;

FIGURE 2 is a side elevation of the fuel cell battery in FIGURE 1 with two of the individual fuel cells shown in cross section on the line A—A of FIGURE 1;

FIGURE 3 is a fragmentary view of the terminal fixing on the line B—B of FIGURE 1.

FIGURE 1 illustrates diagrammatically a typical installation. A battery of fuel cells, indicated generally at 1 is mounted on a suitable surface by supports 2. Air is fed by a compressor 3, driven by an electric motor 4, through a pipe 5. The pipe 5 passes along the top of the battery with individual supply pipes 6 feeding air to manifolds 7 formed in the top edge of each cell. From the manifolds the air passes through passages 8 into the porous electrode material 9 which is on one face of each of the electrodes. The air passes through the porous electrode material and then through passages 10 into further manifolds 11 formed in the bottom edge of each cell. From the manifolds it passes through pipes 12 into a pipe 13 where it passes to exhaust.

A similar flow of fuel gas also passes through the cells. A suitable fuel gas is supplied in the present example, from a pressurised storage vessel 14 containing carbon monoxide passing through a pressure inducing and shut off valve 15 via pipe 16 and individual pipes 17 to manifolds 18 formed in the edges of each of the cells. From the manifolds 18 it passes via passages 19 into the porous electrode material 20 on the other face of each of the electrodes and then through passages 21, manifold 22, and pipes 23 to pipe 24 and then to exhaust.

Inserted in the pipe 5 from the compressor 3 is an air heater 25, containing an electrical heating element 26, connected to a suitable electrical supply at terminals 27. The heating element can be switched on and off by a switch 28, and by a thermostatically controlled switch 29. Inserted in the fuel cell battery is a thermostat 30, the sensitive element of which, shown dotted at 31, is immersed in the electrolyte of the fuel cells. The thermostat 30 is connected to the switch 29 by a Bourdon tube 32.

The output of the cell is taken by way of leads 33, one of which is connected to a terminal 34, the other lead, which can be considered as the earth lead, being connected to a terminal 35 on one of the members of the fuel cell battery. The output of the battery is shown connected, as an example, to an electric motor.

Whilst the cell is operating, cooling may be required. An electrically driven fan 36 is provided, the motor of which is connected to the leads 33 from the cell. A thermostatically operated switch 37 is placed in the supply to the electric motor of the fan for switching it on and off. Inserted in the fuel battery is a second thermostat 38, the sensing element 39 of which is also immersed in the electrolyte. The thermostat is connected to the switch 37 by a Bourdon tube 40.

The construction of the fuel cell battery will be more readily seen in FIGURE 2. A series of plates 41, made for example of a heat resisting steel or alloy, are provided, except for the end plates, with a cavity on each side, the cavities containing porous electrode material 42. The electrode material consists of a mixture of metallic silver and zinc oxide. The end plates have only one cavity, which is formed in the face cooperating with the adjacent plate, the cavity being filled with the porous electrode material 42. The plates are separated by annular spacing members 43, which are electrically non-conducting, the spaces 44 thus formed between the plates 41 being filled with electrolyte, for example, fused metal salts.

The assembly of plates and spacers is held together by a pair of spider members 45 and 46 which are bolted together at the four corners, the spacer members forming liquid tight seals between the plates. An electrically insulating member 47 is positioned between the spider 46 and the adjacent end plate.

It will be seen that the plates form a series of electrodes, the material on each side of a plate being connected through the plate itself while the electrode material on adjacent plates is separated by the electrolyte, thus forming a battery of cells in series, one terminal 35 being on the spider member 46 and the other terminal 34, connected to the end plate adjacent to the spider member 46.

Each plate has machined in each of its four edges non-intercommunicating slots forming, respectively, the air and fuel gas manifolds 7, 11, 18 and 22, the air and fuel gas passing from the inlet manifolds 7 and 18 by means of pipes 8 and 19, through the porous electrode material and through pipes 10 and 21 to the outlet manifolds 11 and 22 as described above.

The connection of the lead to the end plate by means of terminal 34 is shown in FIGURE 3. A bolt 48 having a countersunk head 49 is held in a suitably countersunk hole in the end plate 41, the stem of the bolt extending through a hole in the insulating member 47 into a bore 50 in the central boss 51 of the spider member 46. A nut 52 secures the bolt in the plate 41, a second nut 53 securing one of the leads 33 to the bolt.

The porous electrode material can be made in various ways, but in the example described above, a convenient method is to pack a powdered mixture into one of the cavities of the plates, packing the mixture sufficiently to ensure electrical continuity between the particles, but at the same time allowing free access of gas.

The electrolyte may be of any suitable type and in addition to the example given above, an electrolyte of the semi-solid form as described in copending application No. 629,218 may be used. This electrolyte, at the operating temperature of the cell, is in the form of a solid matrix having liquid in its interstices. It is sufficiently rigid to be self-supporting and the spacers 43 in FIGURE 2 can be dispensed with. However if the spacers are omitted, provision must be made during assembly of the cell to position the individual plates correctly, so as to provide electrolyte spaces.

Alternatively, the individual plates with the porous electrode material may be made as a unit comprising a rigid, self-supporting, porous solid electrode in the form of a porous cermet consisting of zinc oxide bonded with metallic silver. The good mechanical strength and excellent resistance to thermal shock of such electrodes simplifies the mechanical problems of constructing fuel cells and the performance of such electrodes is fully equal to that of the powdered electrodes described above.

The operation of the installation illustrated in FIGURE 1 is as follows. To bring the cell to its operating temperature it is necessary to heat it. This is done by passing air from the compressor 3 through the heater 25. Switch 28 is closed and the element 26 heats the air which passes through the cell battery 1 exhausting at 13. When the battery, and thus the electrolyte, has reached the correct temperature the thermostat 30 shuts off the heating element 26. Valve 15 is opened allowing fuel gas to flow to the battery, the fuel gas flowing through the cells of the battery, the spent gas exhausting at 24. As the reaction within the cell takes place an electrical output is available at the terminals 34 and 35, to which an electrical load, for example an electric motor, can be connected. As the cell operates heat is developed in excess of that lost by normal radiation etc., and the operating temperature of the cell tends to increase. This is controlled by the cooling fan 36. When the temperature of the electrolyte exceeds a predetermined temperature, the thermostat 38 switches on the cooling fan, switching it off again when the electrolyte temperature has fallen to a valve slightly lower than at which the cooling fan is switched on. Should the load be disconnected for a short while, which would mean that less, or no, heat was produced in the battery and the temperature fall, then thermostat 30 would again switch on the heater element 26 to maintain the battery at the operating temperature. Where the electrolyte was of the type which was semi-solid at the operating temperature and no sealing members were used, the temperature controlled by the thermostats would be such that the electrolyte was always maintained in the correct condition.

The porous electrode material may be made in various ways and the following descriptions and examples illustrate the invention without limiting it.

The silver/zinc oxide mixture may be made by impregnating finely powdered zinc oxide with silver nitrate solution, drying and igniting at a temperature sufficient to reduce the silver nitrate to metallic silver. A better dispersion may be obtained if the dried, impregnated oxide is first heated to the melting point of silver nitrate and is then cooled, finely ground and re-heated to decompose the silver salt.

Alternatively, the silverized zinc oxide may be prepared by ball-milling silver powder with finely powdered zinc oxide or by oxidizing a silver-zinc alloy, or by impregnating the powdered oxide with any silver salt which can subsequently be decomposed to give metallic silver. Such salts include silver nitrate, oxalate and acetate. A similar result may be achieved by co-precipitating zinc and silver carbonate from nitrate solutions and igniting the precipitate.

The electrodes may be made by packing the silver/zinc oxide mixture into a shallow cavity between the cell body and the surface of the electrolyte and compacting sufficiently to ensure electrical continuity between the particles, but at the same time allowing free access of gas.

The porous cermet electrodes may be made by the processes commonly employed in powder metallurgy. For example, a powdered mixture of silver and zinc oxide prepared in the manner described above may be mixed with a volatile spacing agent and sintered at about 900° C. Preferably, however, the required porosity of the electrode is obtained by self-spacing, i.e. by sintering carefully graded silverized zinc oxide granules containing no fines. The mechanical strength may be improved by adding silver powder to the mix before sintering.

In one form of the present invention the electrodes are made by mixing the zinc oxide with a silver-copper alloy powder and subsequently pressing and sintering. Such electrodes containing copper have good mechanical strength and are catalytically more active but at the same time react more slowly to changes in gas composition.

Porous cermet electrodes made in accordance with the present invention may be employed in gas fuel cells with solid electrolytes and in cells with fused electrolytes held in very fine pore ceramic plates or tubes. They may also be employed in cells with semi-solid electrolytes of the type described in our copending application of even date provided that such semi-solid electrolytes contain a proportion of very fine inert filler so that the pores in the solid matrix are small compared with the pores in the cermet. If, however, the fused electrolyte is held in a coarse-pored ceramic, or if the pores in the solid matrix of the semi-solid electrolyte are large, there is a tendency for the fused electrolyte to be drawn in the pores of the electrodes by capillary forces. The same thing occurs when the electrodes operate in a completely fused electrolyte. Eventually the gas passages become blocked completely and the cell ceases to function. We have found that this can be prevented by employing a double-layer of cermet, the inner layer of large pore size and an outer fine-pore layer.

By suitably adjusting the pore sizes of the two layers of the cermet it is possible to ensure that the combined effect of capillary forces and hydrostatic head of the fused electrolyte will not cause the fused electrolyte to penetrate beyond the junction of the fine and coarse layers. At the same time, if the pore diameter of the fine layer is correctly chosen, the operating gas pressure will be insufficient to force the electrolyte out of the fine-pore layer and cause the gas to bubble through the electrolyte to waste.

When employing double-layered porous cermet electrodes it is absolutely essential that the individual grains of which the coarse-pored layer is composed shall be impervious to fused electrolyte, since, otherwise the electrolyte will penetrate the extremely fine capillary passages in the individual grains of the coarse-pored layer. It is necessary, therefore, either to use fused zinc oxide for making the cermet, or to pre-sinter the oxide at 1000° C. or higher before bonding with silver. The stage of impregnating with silver nitrate solution is no longer necessary.

The double-layered porous cermet electrodes may be manufactured in the form of a disc by first pressing the fine-pore material into a thin disc in a circular steel mould and then pressing a layer of coarse-grained material on top thereof, the composite disc being subsequently sintered and then mounted in a stainless steel electrode body.

Alternatively the electrode may consist of a flat porous cermet plate with a central coarse-pored core completely surrounded by a fine-pore layer. Stainless steel gas feed tubes are inserted into holes drilled through the edges of the plate into the core and fixed by welding or silver soldering to the cermet. The plates are made by first pressing a fine pore layer in a mould; then pressing the coarse core with a removable steel insert round the inside of the mould to blank off the edges; and finally removing the insert, filling the space round the edges with fine powder, covering the whole with the second fine-pore layer and compressing the composite plate. Sintering is carried out as before. Since these electrodes have two active surfaces they may be used for building compact fuel cells with alternate air and fuel electrodes completely immersed in electrolyte.

Fuel cells with these electrodes in completely fused electrolytes have been operated for long periods without trouble. Even when the electrodes are deliberately flooded by reducing the gas pressure they can be restored to normal working order by the simple expedient of raising the gas pressure and forcing the molten electrolyte back to the junction between the fine and coarse-pored layers.

The following examples illustrate the invention without limiting it.

Example 1

75 parts of zinc oxide were mixed in a ball mill with 25 parts of silver powder. The powdered mixture obtained could be used either as a gas electrode or an oxygen electrode in a fuel cell of the type described.

Example 2

"Analar" zinc oxide powder was mixed to a thick paste with silver nitrate solution in the proportions to give a ratio of zinc oxide to metallic silver of 70:30. The paste was dried, broken down and graded, the fraction 36 to 52 mesh B.S. being used to make the cermet. This fraction was initimately mixed with 20% by weight of precipitated silver powder, slightly damped with water and lightly pressed in a mould at a pressure of 0.3 to 0.5 p.s.i. into a rectangular plate 6 mm. thick. The pressed plate was heated slowly to 900° C. At 212° C. the silver nitrate fused and caused the granules to coalesce at the points of contact. At about 400° C. the silver nitrate decomposed leaving a continuous layer of silver on the surface of the granules. The full strength was developed by sintering for one hour at 900° C. The cermet had a specific resistance of 0.01 ohm cm. and a porosity of 50%. The gas permeability was 2.27 l./min./cm.$^3$/p.s.i. press. difference.

In an alternative method employing the addition of copper as a flux the electrodes were made more simply by intimately mixing the zinc oxide with about 30% of a silver-copper alloy powder, containing 10% copper, pressing and sintering for 1 hour at 1000° C.

Example 3

"Analar" zinc oxide powder was pre-sintered at 1,000° C. for 2 hours and the pore-free mass was broken down and graded. The fraction −150 mesh B.S. was used for the fine layer and the fraction −36+52 mesh B.S. for the coarse layer of a double-layered porous cermet. The fine fraction was intimately mixed with 30% of silver powder containing 10% of copper and the mixture was damped with industrial methylate spirit and pressed into a thin disc in a circular steel mould at a pressure of 2–3 tons per sq. in. A layer of coarse-grained mixture of the same composition was then pressed on top of the fine-grained layer and the composite disc was sintered for 1 hour at 1000° C. The sintered disc was mounted in a stainless steel electrode body with the coarse layer facing the gas space and the electrode assembly was immersed in a fused electrolyte bath consisting of 41% lithium carbonate and 59% sodium carbonate by weight. At 600° C. and with an operating gas pressure of 20 ins. of water, the electrolyte did not flood the porous electrode. Gas did not bubble through the electrode until the pressure was raised 20 ins. of water above the operating pressure.

*Example 4*

75 parts by weight of −150 B.S. mesh "Analar" zinc oxide was mixed with 25 parts by weight of −150 mesh silver/copper mixture (containing about 10% copper) and ball-milled for about 4 hours. The mixture was pressed at 3 t.s.i. and sintered at 1000° C. for 1 hour and gave an impervious cermet of good electrical conductivity. This cermet was broken up and graded.

To make a rigid porous electrode the fraction −36+52 B.S. mesh is used. This is pressed at 1½ t.s.i. and sintered for half an hour at 1100° C.

To make a double pore electrode the fraction −150+200 B.S. mesh is used, the procedure being as previously described in Example 3.

*Example 5*

A fuel cell of the type described in which both the fuel gas electrode and the oxygen electrode were composed of the mixture described in Example 1 was provided with an electrolyte consisting of a mixture of lithium and sodium carbonates containing 15% by weight of sodium carbonate. The fuel gas electrode was fed with carbon monoxide and the oxygen electrode with air containing a proportion of carbon dioxide. At an operating temperature of 600° C. the cell gave an open-circuit E.M.F. of 1.1 volts. Currents of 40 amps./sq. ft. of superficial electrodes area could be taken from the cell with a terminal voltage of 0.7 volt, representing a free energy efficiency of about 64%.

The fuel cell electrodes of the present invention are equally effective as oxygen electrodes or fuel electrodes; they respond rapidly to changes in conditions; they enable the full theoretical voltage to be attained; they are chemically stable; and they do not polarise at relatively high current densities.

The advantage of having the fuel electrodes and oxygen electrodes of the cell of identical material is that the polarity may be reversed quite readily by reversing the gas connections. Periodical reversal in this way may be used to correct any tendency to partial separation of the components of a multi-component electrolyte due to differing ionic mobility.

A further important advantage of a fuel cell made in accordance with the present invention is that the electrodes are non-specific in action and work well with any fuel gas, e.g. hydrogen, carbon monoxide, methane, methanol and hydrocarbon vapours.

The operation of gas fuel cells at relatively low temperatures with fuels containing high proportions of carbon monoxide is complicated by the carbon deposition reaction:

$$2CO = CO_2 + C$$

This is not a serious problem above 800° C. but below 700° C. it can lead to complete blockage of the cell. The reaction is catalysed by oxides of iron. We have found that carbon deposition can be suppressed completely by avoiding the use of iron oxides or easily reducible iron compounds in the cell. The silverized zinc oxide electrodes are harmless in this connection.

In a preferred form of the present invention a fuel cell containing sliverized zinc oxygen and fuel electrodes has as its electrolyte the composition disclosed in our co-pending application of even date.

We claim:

1. In a fuel cell for the production of electrical energy by the decomposition of a fuel gas an oxydising gas only, at least one non-consumable electrode composed of a porous intimate mixture of zinc oxide and metallic silver, the said mixture containing at least 1% silver, the pore size of the electrode being such that flooding of the electrode is prevented by surface tension.

2. A fuel cell according to claim 1 wherein said mixture contains from 20% to 50% of silver.

3. A fuel cell according to claim 1 wherein said electrode is composed of a porous cermet consisting of zinc oxide powder bonded with metallic silver.

4. A fuel cell according to claim 2 wherein said electrode is composed of a porous cermet consisting of zinc oxide powder bonded with metallic silver.

5. A fuel cell according to claim 3 wherein said cermet comprises a layer of large pore-size and a layer of fine pore-size, the latter layer being in contact with the electrolyte.

6. A fuel cell according to claim 4 wherein said cermet comprises a layer of large pore-size and a layer of fine pore-size, the latter layer being in contact with the electrolyte.

References Cited in the file of this patent

UNITED STATES PATENTS

| | | |
|---|---|---|
| 2,384,463 | Gunn et al. | Sept. 11, 1945 |
| 2,640,864 | Fischbach et al. | June 2, 1953 |
| 2,830,109 | Justi et al. | Apr. 8, 1958 |
| 2,860,175 | Justi | Nov. 11, 1958 |
| 2,880,258 | Purcher et al. | Mar. 31, 1959 |
| 2,947,797 | Justi et al. | Aug. 2, 1960 |